US007876083B2

United States Patent
Perrault et al.

(10) Patent No.: US 7,876,083 B2
(45) Date of Patent: Jan. 25, 2011

(54) DIGITAL COMPENSATION TUNING FOR SWITCHING POWER SUPPLY CONTROL

(75) Inventors: Paul A. Perrault, Beaverton, OR (US); Tod F. Schiff, Portland, OR (US); David I. Hunter, Portland, OR (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 564 days.

(21) Appl. No.: 11/735,615

(22) Filed: Apr. 16, 2007

(65) Prior Publication Data
US 2008/0246458 A1 Oct. 9, 2008

Related U.S. Application Data

(60) Provisional application No. 60/910,507, filed on Apr. 6, 2007.

(51) Int. Cl.
*H02M 5/257* (2006.01)
(52) U.S. Cl. .................. 323/322; 323/283
(58) Field of Classification Search .......... 323/271, 323/282, 283, 318, 322, 326, 351
See application file for complete search history.

(56) References Cited

U.S. PATENT DOCUMENTS 7,504,810 B1 * 3/2009 Tagare ............ 323/282

| 2003/0207679 A1 * | 11/2003 | Kaczynski et al. ......... 455/339 |
| 2005/0066367 A1 * | 3/2005 | Fyke et al. ................. 725/68 |
| 2006/0055385 A1 * | 3/2006 | Schiff ......................... 323/282 |
| 2008/0122292 A1 * | 5/2008 | Minami ....................... 307/44 |

OTHER PUBLICATIONS

Garcea et al; Digital auto-tuning system for inductor current sensing in VRM applications; Mar. 2006; 10.1109/APEC.2006.1620583; pp. 493-498.*
Ciancio et al; 1 Gb/s Fiber Optic Tranmitter Design usuing Intersil Digitally Controlled Potentiometer ICs; Jun. 28, 2005; Intersil; pp. 1-5.*
Analog Devices, Inc., 8-Bit Programmable 2- to 4-Phase Synchronous Buck Controller, ADP3192, 2006, pp. 1-32.

* cited by examiner

*Primary Examiner*—Harry Behm
*Assistant Examiner*—Matthew Grubb
(74) *Attorney, Agent, or Firm*—Robert F. Hightower

(57) ABSTRACT

A tuner having one or more digitally controllable tuning components may be coupled to an analog feedback compensation network in a target switching power supply controller to adjust the compensation while the power supply is operating. A communication interface couples the tuner to a host having a software interface to enable a user to adjust the values of the tuning components. The tuner may include components to adjust the values of a feedback network, an input network, a ramp adjust component, etc., on the target controller.

10 Claims, 5 Drawing Sheets

DIGITAL COMPENSATION TUNING FOR SWITCHING POWER SUPPLY CONTROL

This application claims priority from U.S. Provisional Patent Application Ser. No. 60/910,507 filed Apr. 6, 2007 titled Digital Compensation Tuning For Switching Power Supply Control.

BACKGROUND

FIG. 1 illustrates a prior art switching power supply having a controller with analog voltage mode feedback control. The system of FIG. 1 includes a power path 10 that controls the flow of power from a power source to the output in response to the modulation signal MOD. The power path may embrace any suitable switching power supply topology and therefore may include any suitable number and combination of switches, transformers, inductors, capacitors, diodes, and the like. The modulation signal MOD is provided by a pulse width modulation (PWM) control arrangement in which a comparator 12 compares an error signal $V_{ERR}$ to a ramp signal RAMP that is generated by an oscillator 14. A resistor $R_R$ sets the size of the ramp signal.

The error signal $V_{ERR}$ is generated by an error amplifier 16 which has a feedback network including resistor $R_A$ and capacitors $C_A$ and $C_{FB}$, and an input network including resistor $R_B$ and capacitor $C_B$. The power supply output voltage $V_{OUT}$ is sensed by the input network, and a reference signal $V_{REF}$ determines the set point to which the output is regulated. The reference signal may be offset by a current feedback signal, for example, a droop voltage may be provided for active positioning of the output voltage as a function of current, commonly known as active voltage positioning (AVP).

Switching power supplies are often used for demanding devices such as high-performance microprocessors, and therefore, their controllers must be carefully tuned to respond to a wide array of steady-state and transient load conditions over their entire operating range. The design process typically begins by selecting a value for resistor $R_B$ which, in combination with current source $I_{FB}$, determines the offset of the nominal power supply output voltage at no load. Next, the ramp resistor $R_R$ is selected to provide the best combination of thermal balance, stability, and transient response. Finally, the values of $C_A$, $R_A$, $C_B$ and $C_{FB}$ are selected to provide the feedback loop compensation with the best possible response to a load transient.

Equations have been developed to determine the best known stating points for all of these component values. The optimal values of the components, however, must typically be determined through a tuning process in which a circuit is first built using the calculated values of components and then subjected to testing under actual load conditions. The component values are then adjusted through a trial-and-error process to provide proper load line setting, transient response, etc.

Adjusting component values is a time consuming process. Once a seemingly optimal value of one component is determined, the value of another component must then be determined. After changing the second component, however, the first component may need readjustment. This is an undesirable burden even in a system having just one or two components to adjust. In a system having upwards of five or six different tuning components, the time required to repeatedly remove, reinstall and retest the components may become excessive.

DETAILED DESCRIPTION

Figure 1:
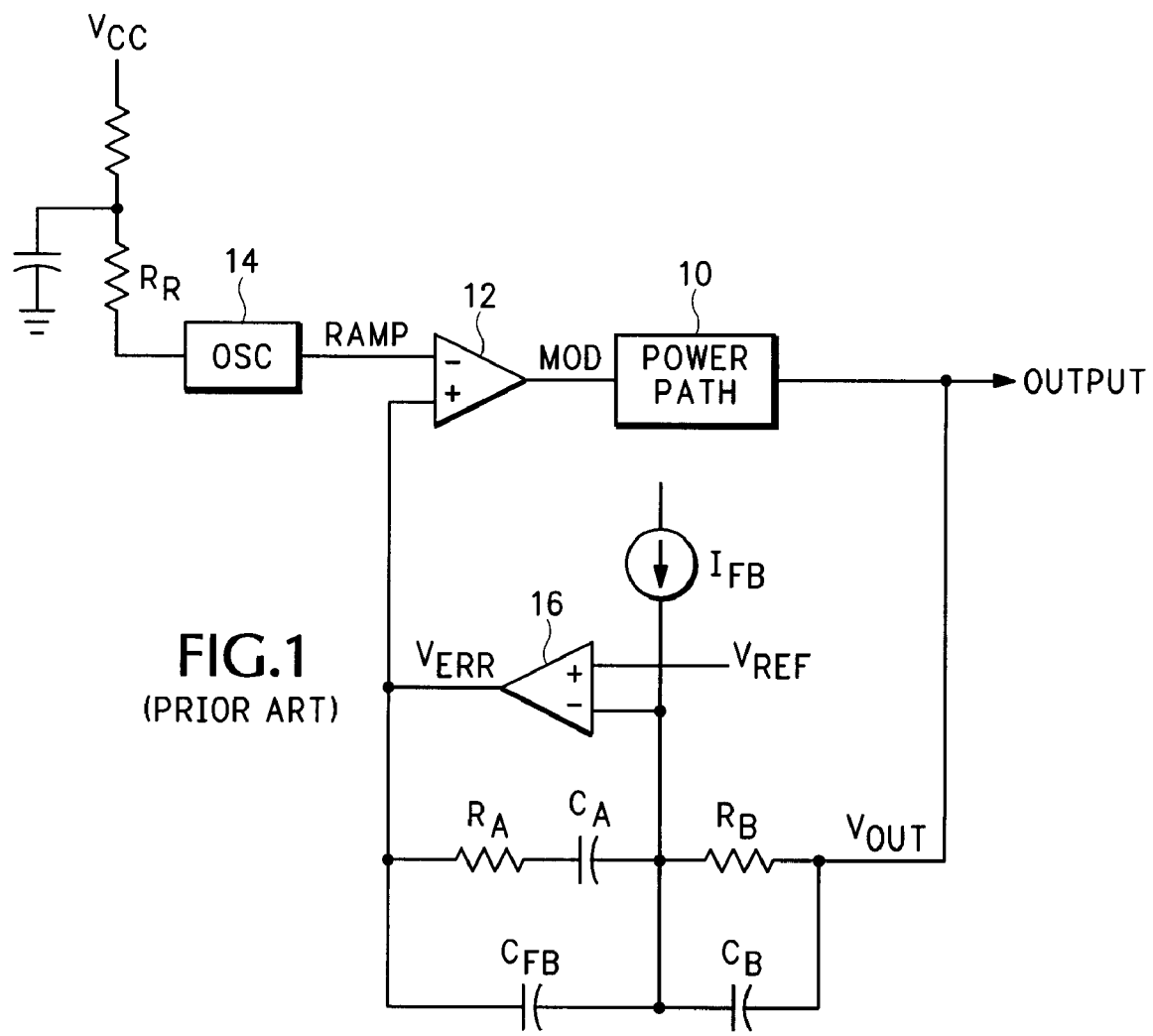
FIG. 1 illustrates a prior art switching power supply and controller.
Figure 2:
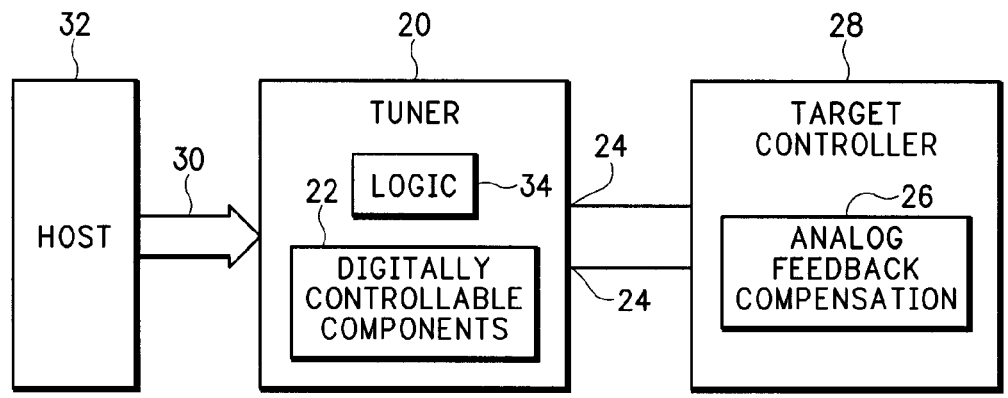
FIG. 2 illustrates an embodiment of a system for tuning an analog feedback compensation network in a switching power supply controller according to some of the inventive principles of this patent disclosure.

FIG. 2 illustrates an embodiment of a system for tuning an analog feedback compensation network in a switching power supply controller according to some of the inventive principles of this patent disclosure. The system of FIG. 2 includes a tuner 20 having one or more digitally controllable tuning components 22, and two or more terminals 24 to couple the tuning components to an analog feedback compensation network 26 in a target switching power supply controller 28. A communication interface 30 couples the tuner to a host 32 which sends commands to the tuner. Logic 34 in the tuner adjusts the tuning components in response to the commands in real time while the switching power supply controller is operating. The host includes a software interface that enables a user to adjust the values of the tuning components in real time.

Figure 3:
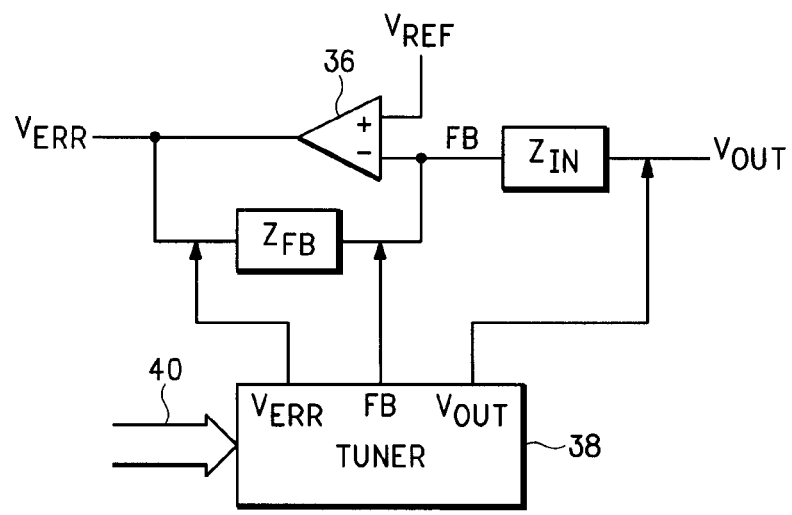
FIG. 3 illustrates an example of how a tuner may be connected to a switching power supply controller according to some of the inventive principles of this patent disclosure.

FIG. 3 illustrates an example of how a tuner may be connected to a switching power supply controller according to some of the inventive principles of this patent disclosure. Tuner 38 includes digitally controllable tuning components to replace or supplement the feedback network $Z_{FB}$ and the input network $Z_{IN}$ for an analog error amplifier 36 in a target switching power supply controller, which would typically be fabricated on a printed circuit (PC) board. In this example, the tuner is connected to the controller at three signal nodes $V_{ERR}$, $F_B$ and $V_{OUT}$. Logic in the tuner adjusts the tuning components in response to commands received from a host through communication interface 40 while the switching power supply controller is operating, or during pauses in operation.

Figure 4:
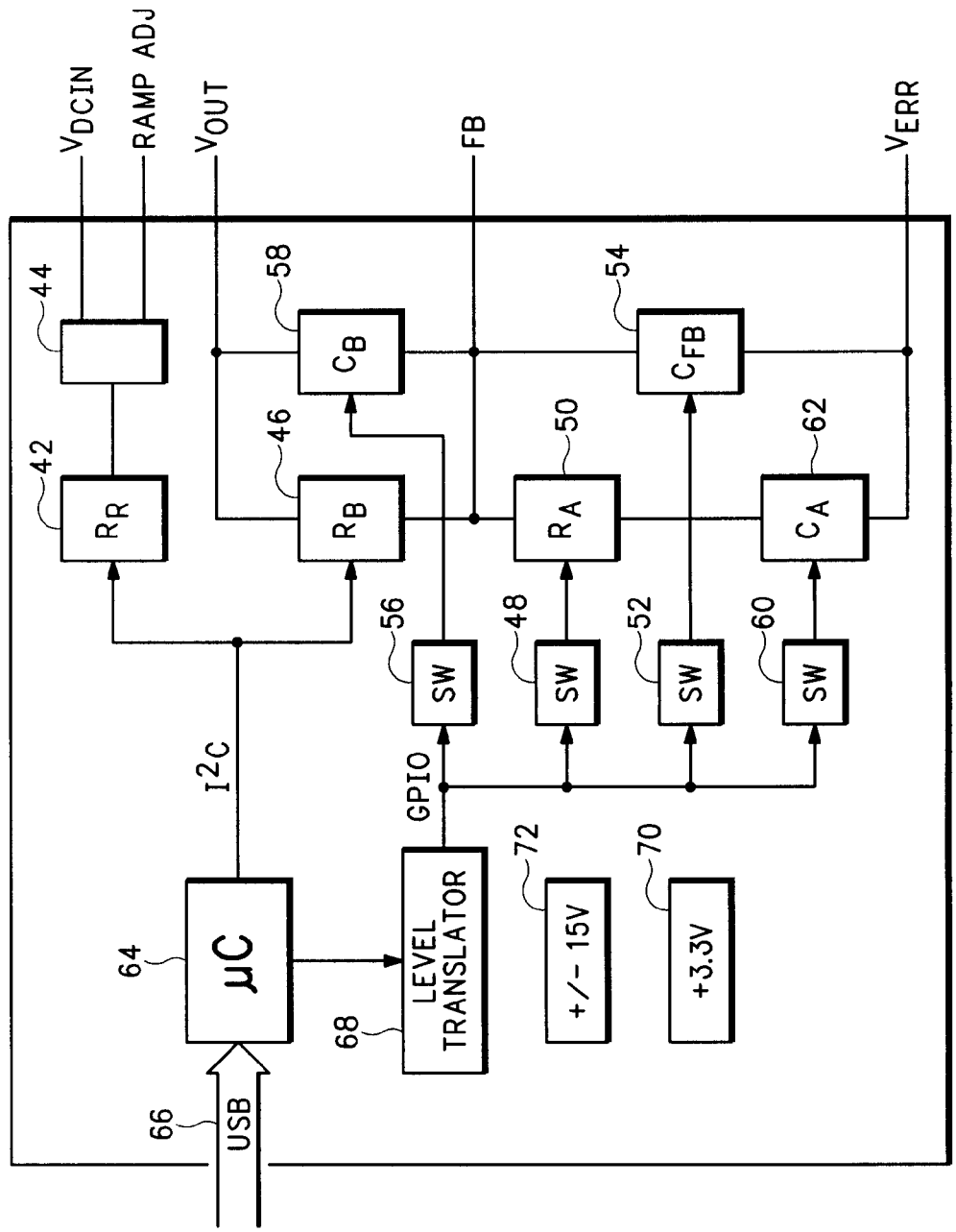
FIG. 4 illustrates an example embodiment of a more detailed implementation of a tuning system according to some of the inventive principles of this patent disclosure.

FIG. 4 is a block diagram of a more detailed implementation of a tuning system according to some of the inventive principles of this patent disclosure. In this example, the tuner is intended to work with a commercially available switching power supply controller such as an ADP3192 to provide a working context for explaining the operation of the system, but the inventive principles are not limited to any particular commercial implementation.

The embodiment of FIG. 4 includes digitally controllable tuning components to enable adjustment of a feedback network with $R_A$, $R_C$ and $C_A$, an input network with $R_B$ and $C_B$, as well as a ramp adjust resistor $R_R$. The ramp adjust resistor $R_R$ is implemented with a digital potentiometer 42 such as an AD5259. Because resistor $R_R$ may be subjected to supply voltages that are much higher than the operating voltages used in the tuner, a general purpose rail-to-rail amplifier 44 such as an AD8541 may be used as an impedance converter along with a resistive voltage divider to allow higher voltages to be applied to the tuner while still allowing the digital potentiometer 42 to vary the value of the ramp resistor.

Resistor $R_B$ is implemented with another digital potentiometer 46. Resistor $R_A$ could also be implemented with a digital potentiometer, but in this embodiment, an analog switch array 48 is used to selectively connect a bank of discrete resistors 48 having weighted values so as to reduce the parasitic capacitance. Capacitors $C_A$, $C_B$ and $C_{FB}$ are also implemented with analog switches 52, 56, 60 and discrete capacitor banks 54, 58, 62, respectively. Monolithic switches such as those in an ADG1212 may be used for the switch arrays.

A general purpose microcontroller 64 may be used to implement the logic functions of the tuner. In the example embodiment of FIG. 4, a USB microcontroller such as a CY7C68013A is used because its built-in universal serial bus (USB) interface simplifies the communication interface 66 to a host. The use of a USB interface also allows the tuner to be powered by the host USB port, thereby eliminating the need for a power supply and reducing the complexity, size and cost of the tuner. This may also simplify the connection between the tuner and the target controller because the coupling may be through passive components only.

The digital potentiometers 42 and 46 for $R_R$ and $R_B$ may be controlled directly by the microcontroller through an industry standard $I^2C$ serial interface. Analog switches 48, 52, 56 and 60 are controlled through general purpose input/output (GPIO) lines from the microcontroller. Because the switches operate on +/−15 or +12 volt supplies, a logic-to-high voltage level translator 68 such as an ADG3123 is used to enable the CMOS logic level outputs from the microcontroller to operate the switches. A linear regulator 70, such as an ADP3303 is included to generate a 3.3 volt supply from the 5 volt USB supply for the microcontroller and digital potentiometers. A charge pump regulator 72 such as an ADM8839 generates +/−15 volt supplies for the analog switches.

Connections to the tuner are made through terminals $V_{DCIN}$, RAMPADJ, $V_{OUT}$, FB, and $V_{ERR}$. The tuner may be fabricated on a PC board which is preferably kept as small as practical to make it easier to situate the tuner as close as possible to the target controller. Although the tuner and the target controller may be connected through passive components only, a ground lead may also be provided.

The microcontroller may be programmed to adjust the values of the tuning components in response to commands received from the host through the USB interface. The program may be stored as firmware in nonvolatile on-chip memory or in an auxiliary memory device. Alternatively, the program may be downloaded to the microcontroller through the USB interface each time it is powered up.

The host may be realized as a general purpose computer, as a portable or handheld device, a dedicated device, etc., running a tuning application that enables the user to enter or update values for the tunable components. Such an application may be developed using any of the numerous software development tools that are available commercially. These tools include libraries of software modules for communicating through a USB port or other communication interface. They also include utilities for creating user interfaces such as a graphical user interface (GUI) the enables the user to enter or update values for the tunable components. Using these tools, an application may be readily developed to send commands to the tuner through the USB interface.

Figure 5:
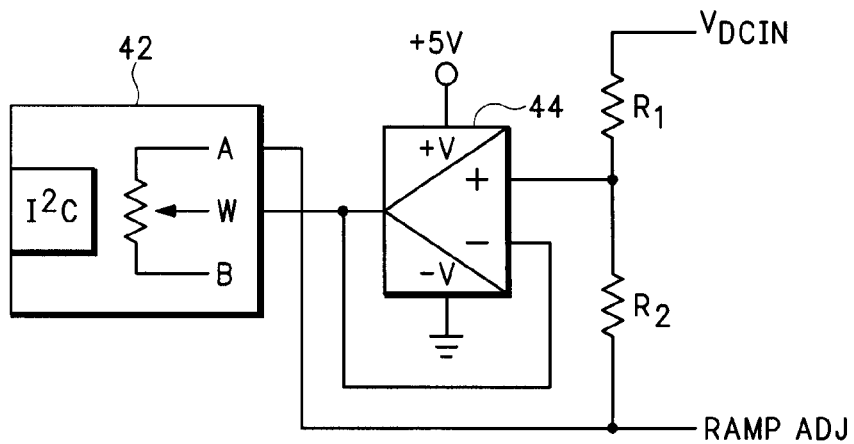
FIG. 5 illustrates an embodiment of an impedance converter according to some of the inventive principles of this patent disclosure.

FIG. 5 illustrates an embodiment of an impedance converter suitable for use with the digital potentiometer for ramp adjustment shown in FIG. 4. The impedance converter in FIG. 5 includes a general purpose rail-to-rail amplifier 44 such as an AD8541 arranged to operate from a +5 volt power supply provided, for example, from a USB interface. Resistors R1 and R2 form a divider between the $V_{DCIN}$ and RAMPADJ terminals to reduce the voltage applied to the noninverting (+) input of the amplifier. The RAMPADJ terminal is also connected to one of the end terminals A or B of digital potentiometer 42. The inverting (−) input of the amplifier is feedback connected to the output OUT as well as to the wiper W of the potentiometer.

Figure 6:
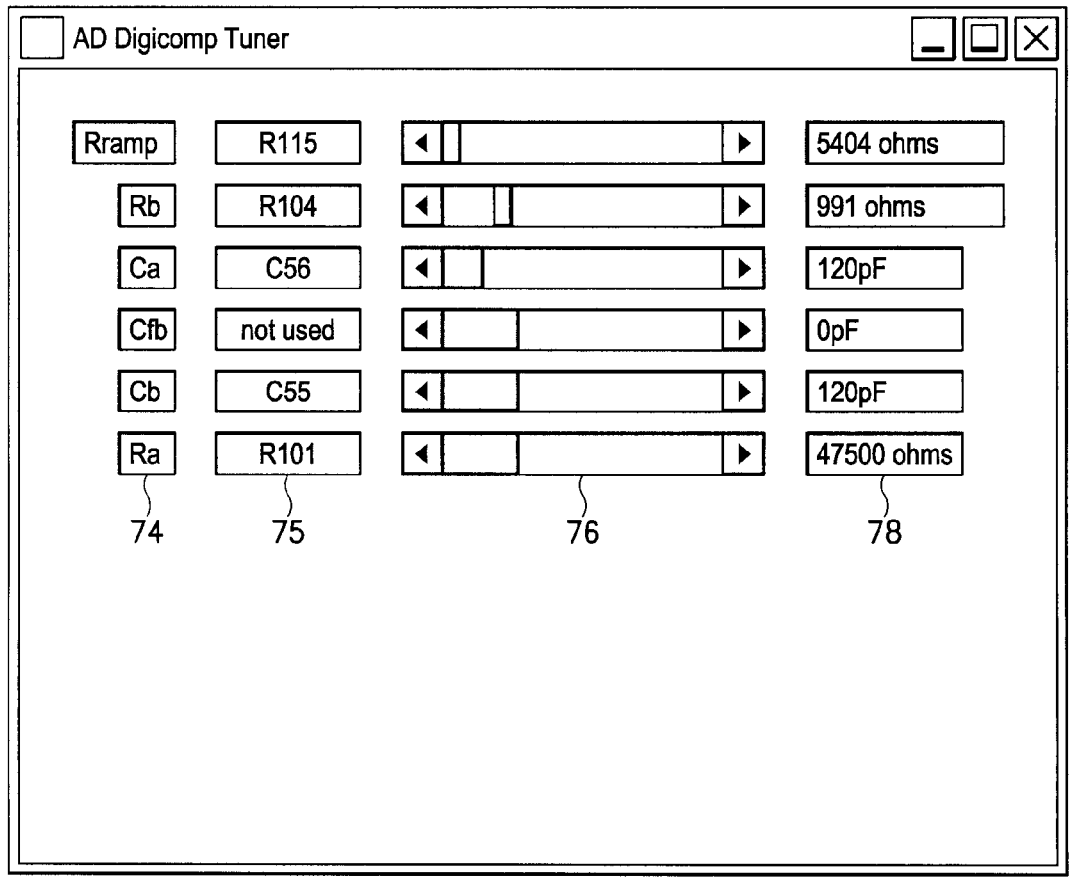
FIG. 6 illustrates an embodiment of a user interface for entering or updating values for tunable components according to some of the inventive principles of this patent disclosure.

FIG. 6 illustrates an embodiment of a user interface for entering or updating values for the tunable components according to some of the inventive principles of this patent disclosure. The GUI of FIG. 6 includes a row of elements for each tunable component on the tuner. Each row includes a label 74 ($R_R$, $R_B$, $C_A$, $C_{FB}$, $C_B$, $R_A$) for the component, an adjustment element 76 such as a slider bar, up/down buttons, or both to adjust the value of the component, and a window 78 to display the current value of the component. An additional window 75 enables the user to enter the actual name of the component used on the target system, if different from the corresponding labels used in the software interface, to eliminate a possible source or errors. The tuning application may send commands providing the component values to the tuner whenever a value is changed. Alternatively, commands may be resent periodically to continuously update the values.

Figure 7:
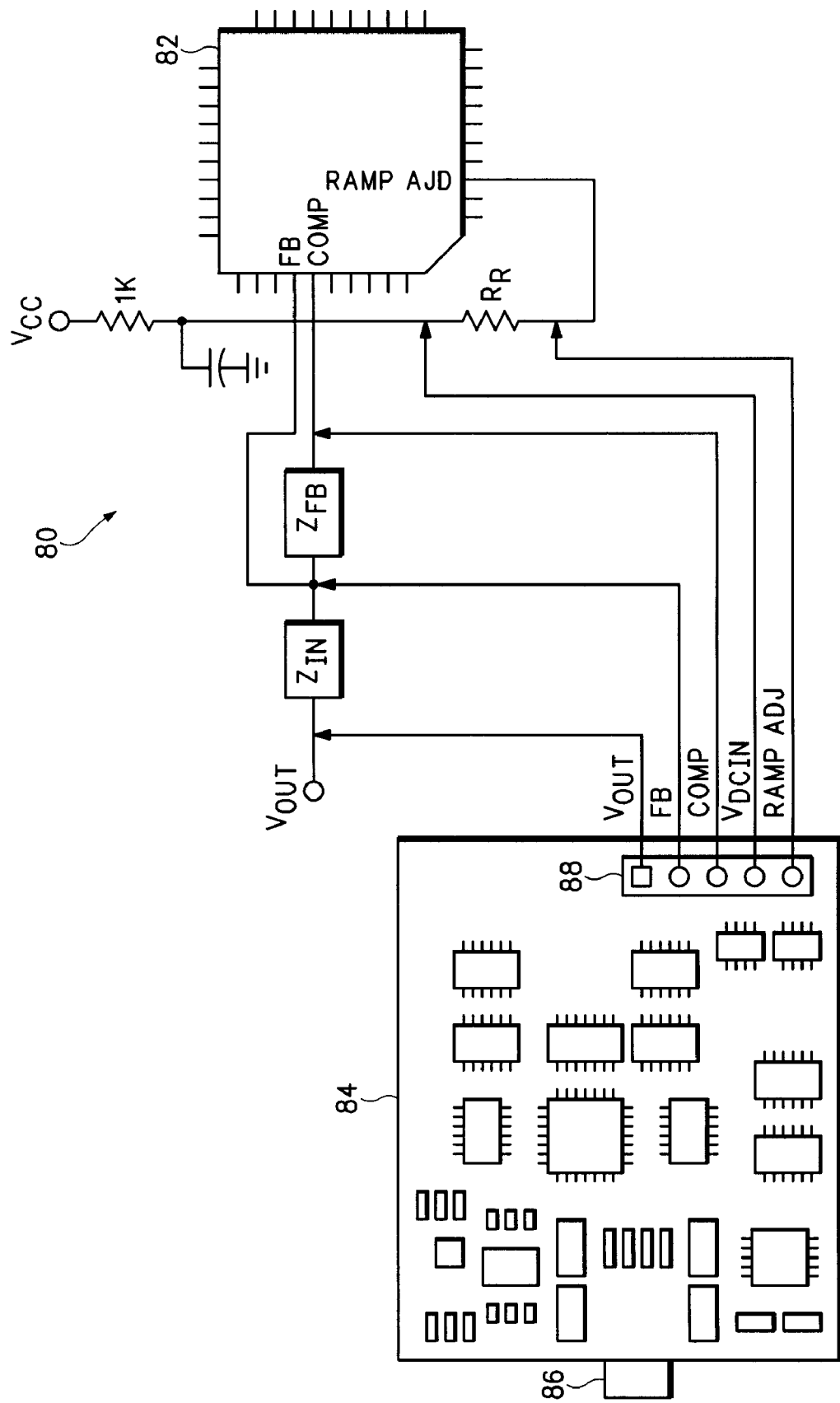
FIG. 7 is a pictorial diagram illustrating an embodiment of tuner and a manner of coupling it to a target switching power supply controller according to some of the inventive principles of this patent disclosure.

FIG. 7 is a pictorial diagram illustrating an embodiment of tuner and a manner of coupling it to a target switching power supply controller according to some of the inventive principles of this patent disclosure. The target controller shown generally at 80 is physically constructed (typically on a PC board) and generally operable as a switching power supply controller, albeit, in need of tuning. The controller includes a commercially available switching power supply control IC (integrated circuit) 82, for example, an ADP3192, ADP3194, etc. The IC in this case has a terminal RAMPADJ to set the size of the internal ramp signal used for PWM control in response to the value of resistor $R_R$. Another terminal COMP provides an error signal as a measure of the output controlled by the integrated circuit. The signal at the COMP terminal is provided by an internal error amplifier in response to a feedback signal received at a terminal FB and a reference signal that sets the output level of the power supply and which may also provide current feedback. The IC may be configured for voltage mode control, in which case input and feedback networks $Z_{IN}$ and $Z_{FB}$ are arranged to sense the output voltage $V_{OUT}$ and set the gain and feedback compensation of the error amplifier. The components in the input and feedback networks are mounted to the PC board by soldering to conductive pads at designated locations and coupled to the IC and other terminals through conductive traces on the board. The functions of the remaining IC terminals are set forth in product data sheets and application notes and will not be repeated here so as not to obscure the inventive principles.

In the embodiment of FIG. 7, the tuner is fabricated on a PC board 84 having a connector 86 such as a USB mini B-type connector to couple the tuner to a host. The terminals FB, COMP, $V_{OUT}$, $V_{DCIN}$ and RAMPADJ may be implemented with any suitable electromechanical configuration such as screw terminals, posts, push in terminals, ribbon cable, headers, plug-in connectors, etc. In this embodiment, the terminals are implemented with a PC board header 88 so the tuner may be mounted directly to the controller by plugging the header onto terminal pins on the controller, thereby minimizing the parasitics associated with coupling the tuner to the target controller.

To begin the tuning process, the components in need of tuning in the feedback compensation network are removed from the controller PC board (or the board is fabricated without the components), and the tuner is coupled to the appropriate component mounting pads, traces or terminals of the controller IC chip. Alternatively, nominal values of the feedback compensation network components may be inserted, and the tuner maybe coupled in shunt with the components on the controller. The controller is then run under real operating conditions while its transient response is observed. The values of the digitally adjustable tuning components in the tuner may then be iteratively adjusted by entering new component values in the host user interface which sends commands to the tuner through the communication interface.

The inventive principles of this patent disclosure may provide a simple and flexible, but very effective technique for tuning an analog feedback compensation network in a switching power supply controller. They are easily adaptable for use with existing switching power supply controllers, and can also be used with new controllers that are specifically designed to accommodate the tuner or have the tuner integrated into the controller. For example, the controller and tuner, including multiplexers, resistors, capacitors, etc., maybe fabricated on a single integrated circuit with a serial-type interface to provide user access. A tuner designed according to inventive principles of this patent disclosure may allow real time feedback compensation while the controller is running under actual operating condition and may provide optimized closed loop response while minimizing output decoupling.

The inventive principles of this patent disclosure have been described above with reference to some specific example embodiments, but these embodiments can be modified in arrangement and detail without departing from the inventive concepts. For example, some embodiments have been shown in the context of Type III compensation, but other types of compensation may also be implemented in accordance with the inventive principles. As a further example, logic may be implemented with hardware, software, firmware, etc., or a combination thereof. Another example for implementation of the disclosed patent principles would be building a tuner that could be used to adjust the feedback of a Gm based error amplifier versus a voltage mode error amplifier. Additionally, some power supplies may not use the RAMPADJ function but may incorporate other methods that still fall under the basic principles disclosed. Also, the inventive principles of this patent disclosure can be assumed valid for not just switching powers supplies but for any compensation of any type of power supply. Such changes and modifications are considered to fall within the scope of the following claims.

The invention claimed is:

1. A system comprising a power supply tuner including:
    one or more digitally controllable tuning components wherein at least one of the digitally controllable tuning components includes a plurality of resistors having weighted values and an analog switch array configured to select a resistor of the plurality of resistors;
    two or more terminals to couple the tuning components to an analog feedback compensation network in a target power supply controller;
    a communication interface to couple the tuner to a host computer that is external to the power supply tuner; and
    logic to adjust the tuning components in response to commands received from the host computer while the target power supply controller is operating; and
    an impedance converter configured to allow voltages from the target power supply controller to be applied to the power supply tuner wherein the voltages from the target power supply controller are higher than voltages of the power supply tuner.

2. The system of claim 1 where the digitally controllable tuning components include a digitally controllable feedback network coupled between first and second ones of the terminals.

3. The system of claim 2 where the digitally controllable tuning components include a digitally controllable input network coupled between second and third ones of the terminals.

4. The system of claim 3 where the feedback network comprises:
    a first digitally controllable capacitor coupled in series with the plurality of resistors between the first and second terminals; and
    a second digitally controllable capacitor coupled between the first and second terminals.

5. The system of claim 4 where the input network comprises a digitally controllable resistor and a third digitally controllable capacitor coupled in parallel between the second and third terminals.

6. The system of claim 1 further comprising the host computer coupled to the tuner through the communication interface wherein the tuner receives power for operating the tuner from the communication interface.

7. The system of claim 1 where the host computer includes a machine readable medium storing executable code to cause the host computer to send commands to the tuner for adjusting the tuning components through the communication interface.

8. The system of claim 1 where the tuning components, terminals, and logic are mounted on a printed circuit board having a connector for the communication interface.

9. The system of claim 1 where the target power supply controller comprises a switching power supply controller.

10. A system comprising a power supply tuner including:
    one or more digitally controllable tuning components wherein at least one of the digitally controllable tuning components includes a plurality of resistors having weighted values and an analog switch array configured to select a resistor of the plurality of resistors;
    two or more terminals to couple the tuning components to an analog feedback compensation network in a target power supply controller;
    a communication interface to couple the power supply tuner to a host computer that is external to the power supply tuner;
    logic to adjust the tuning components in response to commands received from the host computer while the target power supply controller is operating;

a digitally controllable ramp adjustment component comprising a digitally controllable resistor and an impedance converter coupled to the digitally controllable resistor wherein the logic may adjust the ramp adjustment component in response to commands from the host, the impedance converter including a rail-to-rail amplifier coupled to receive a signal from the ramp adjustment terminal; and a terminal to couple the ramp adjustment component to a ramp adjustment terminal in the target power supply controller.

\* \* \* \* \*